United States Patent
Kim et al.

(10) Patent No.: US 8,819,193 B2
(45) Date of Patent: Aug. 26, 2014

(54) METHOD OF SETTING NETWORK, SERVER APPARATUS USING THE METHOD, AND NETWORK SYSTEM INCLUDING THE SERVER APPARATUS

(75) Inventors: Dae-dong Kim, Seongnam-si (KR); Ji-won Chun, Yongin-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 160 days.

(21) Appl. No.: 13/312,181

(22) Filed: Dec. 6, 2011

(65) Prior Publication Data

US 2012/0221688 A1  Aug. 30, 2012

(30) Foreign Application Priority Data

Feb. 28, 2011  (KR) .......................... 10-2011-0018213

(51) Int. Cl.
*G06F 15/173*  (2006.01)

(52) U.S. Cl.
USPC ........... 709/220; 709/219; 709/221; 709/222; 370/254; 370/401

(58) Field of Classification Search
USPC ......................................................... 709/220
See application file for complete search history.

(56) References Cited

U.S. PATENT DOCUMENTS

2003/0018753 A1* 1/2003 Seki ............................. 709/219
2006/0280127 A1* 12/2006 Mizuno et al. ................ 370/254

* cited by examiner

*Primary Examiner* — Tauqir Hussain
(74) *Attorney, Agent, or Firm* — Staas & Halsey LLP

(57) ABSTRACT

A method of setting a network quickly includes: storing network setting information corresponding to a network connection device included in an individual household in a database of a predetermined server apparatus; transmitting unique device information of the network connection device to the predetermined server apparatus; detecting the network setting information corresponding to the unique device information from the database and transmitting the detected network setting information to the network connection device; and performing network setting needed to form a network in the individual household by using the network setting information.

18 Claims, 5 Drawing Sheets

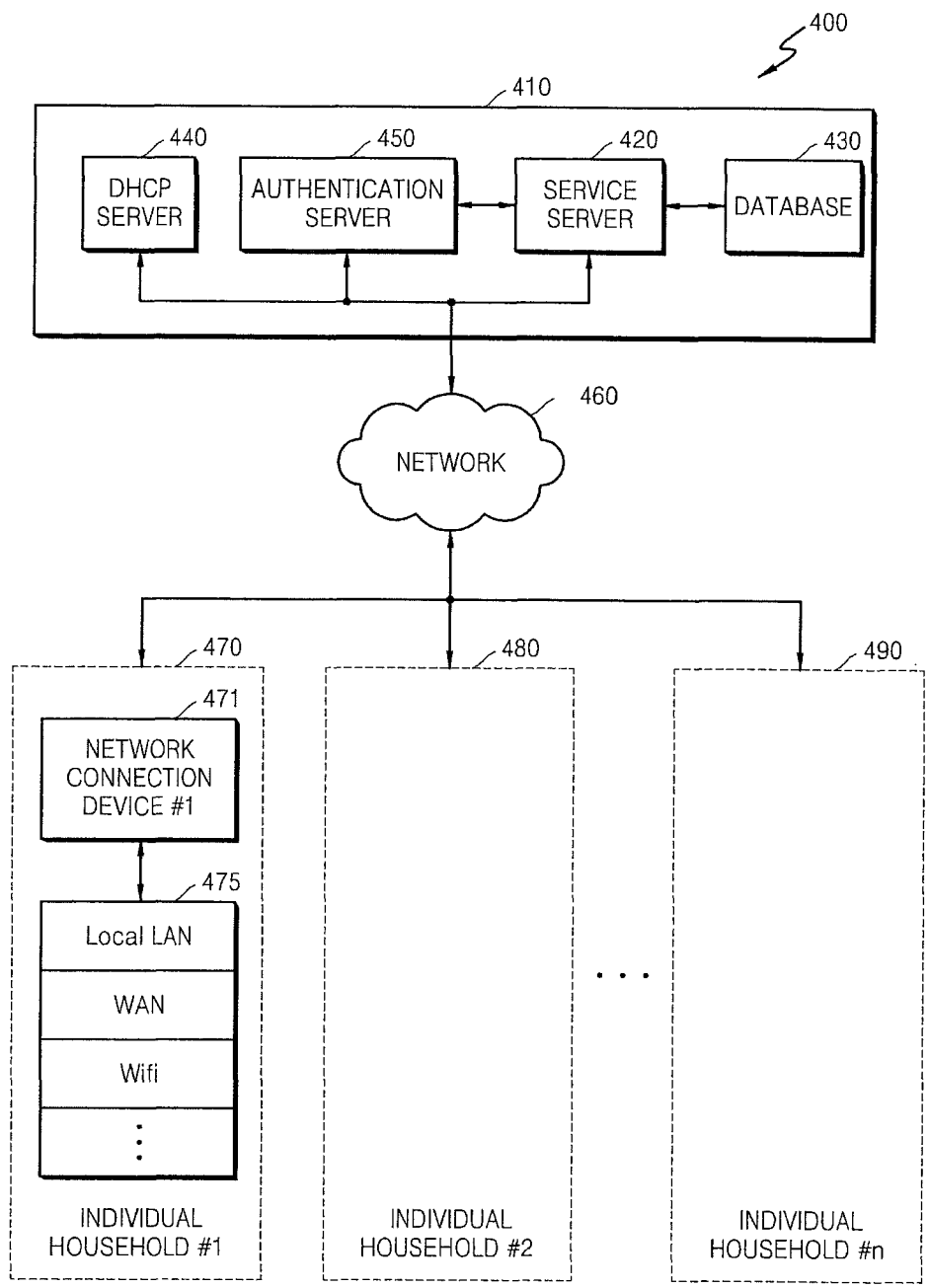

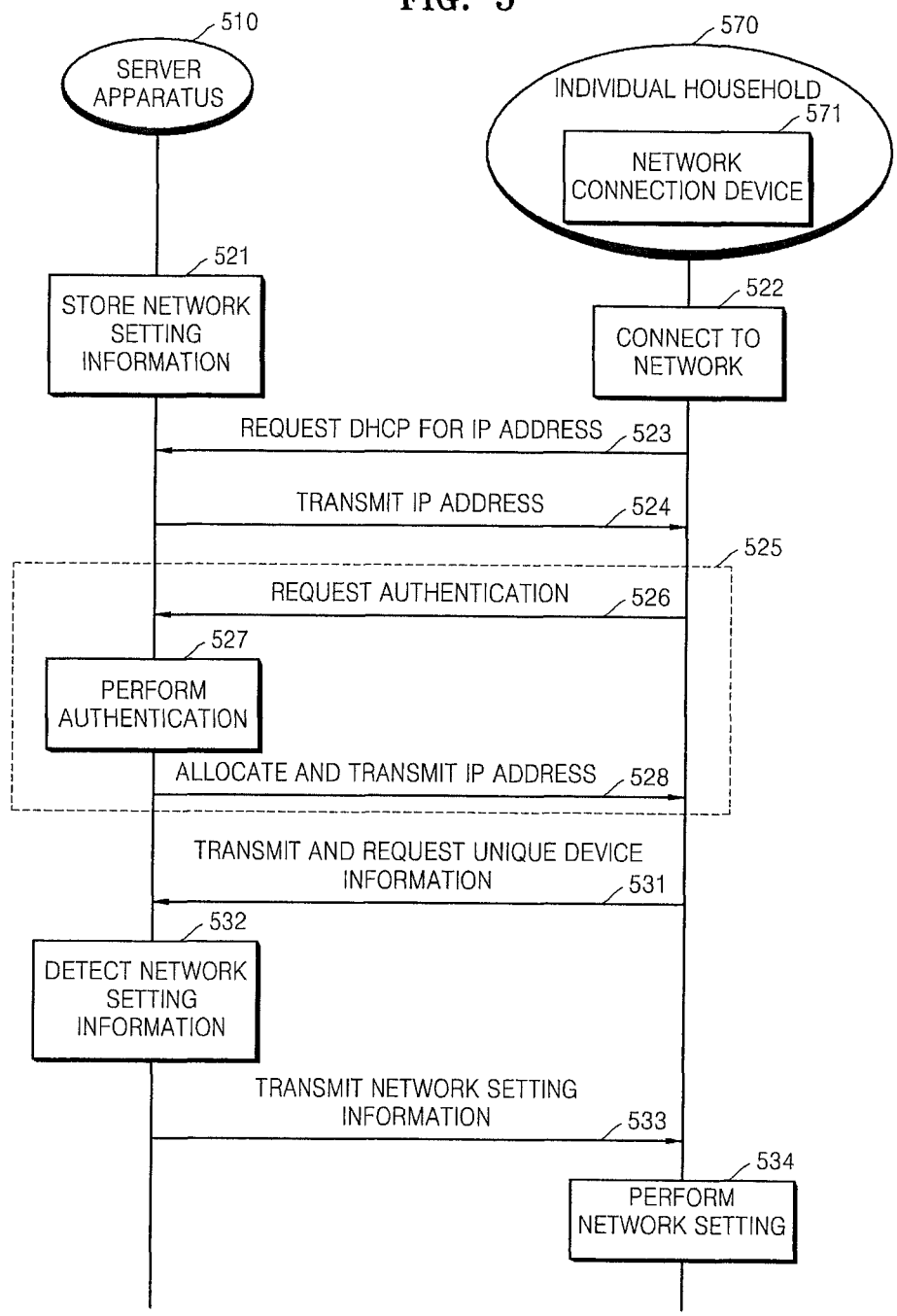

METHOD OF SETTING NETWORK, SERVER APPARATUS USING THE METHOD, AND NETWORK SYSTEM INCLUDING THE SERVER APPARATUS

CROSS-REFERENCE TO RELATED APPLICATIONS

This application claims the benefit of Korean Patent Application No. 10-2011-0018213, filed on Feb. 28, 2011, in the Korean Intellectual Property Office, the disclosure of which is incorporated herein in its entirety by reference.

BACKGROUND

1. Field

The present invention relates to a method of setting a network, a server apparatus using the method, and a network system including the server apparatus, and more particularly, to a method of quickly and easily setting a network, a server apparatus using the method, and a network system including the server apparatus.

2. Description of the Related Art

As there are recent attempts to save energy resources and to develop and use eco-friendly products, a smart grid technology has been highlighted.

Smart grids, which refer to intelligent electricity networks obtained by combining existing electricity networks with information and communication technology, are next-generation electricity networks that may maximize energy efficiency by exchanging information in real time between power generators and power consumers. In order to receive smart grid information, a user should connect to a separate web server which a smart grid provider who develops a smart grid technology publicly provides.

In order to realize a smart grid power system, a predetermined server and an individual household should be networked. Also, in order to realize a home networking system or the like, a predetermined server and an individual household need to be networked.

That is, in a large-scale housing complex, such as an apartment complex, a villa complex, or a housing complex in a predetermined area, each of a plurality of individual households included in the large-scale housing complex and a predetermined server should be connected to each other through a predetermined network.

In the large-scale housing complex, in order to set a network between each of the individual households and the predetermined server, a network worker should manually set the network in each of the individual households. Accordingly, it takes a long time to completely set the network in the large-scale housing complex including the plurality of individual households. Also, since the network worker should set the network, setting errors may occur during operation. Also, if a device needed to form the network, for example, a network connection device, a line sharer, a repeater, or a local area network (LAN) card, is to be exchanged or changed, the network should be set again.

Accordingly, there is a demand for an apparatus and a method for quickly and easily setting a network.

SUMMARY

Additional aspects and/or advantages will be set forth in part in the description which follows and, in part, will be apparent from the description, or may be learned by practice of the invention.

According to an aspect, there is provided a method of setting a network which may minimize a time taken to set the network by automatically setting the network, a server apparatus using the method, and a network system including the server apparatus.

According to another aspect, there is provided a method of setting a network which may avoid errors that may occur when the network is manually set and may easily completely set the network, a server apparatus using the method, and a network system including the server apparatus.

According to another aspect, there is provided a method of setting a network, the method including: storing network setting information corresponding to a network connection device included in an individual household in a database of a predetermined server apparatus; transmitting unique device information of the network connection device to the predetermined server apparatus; detecting the network setting information corresponding to the unique device information from the database and transmitting the network setting information to the detected network connection device; and performing network setting needed to form a network in the individual household by using the network setting information.

The unique device information may be identification information for individually identifying the network connection device.

The unique device information may be a media access control (MAC) address of the network connection device.

The network setting information may include one or more network setting values corresponding to a predetermined network service.

The network setting information may include at least one selected from the group consisting of network service access information for accessing the predetermined network service, Internet protocol (IP) setting information, network access method information for connecting to a predetermined network, authentication information of the predetermined network service, and identification information of the predetermined network.

The network connection device may be a gateway for connecting to a predetermined network.

The method may further include: connecting the network connection device to a predetermined network; connecting to a dynamic host configuration protocol (DHCP) server through the predetermined network to be allocated an IP address; and accessing the predetermined server apparatus by using the IP address.

The method may further include: requesting a predetermined authentication server for authentication, wherein the requesting is performed by the network connection device; in response to the request, performing authentication for allowing access to the predetermined server apparatus, wherein the authentication is performed by the authentication server; and when the authentication is completed, allocating an IP address for accessing the predetermined sever apparatus and transmitting the IP address to the network connection device.

According to another aspect, there is provided a server apparatus for performing network setting needed to form a network in an individual household, the server apparatus including: a database that stores network setting information corresponding to a network connection device; and a service server that receives unique device information of the network connection device, detects network setting information corresponding to the unique device information in the database, and transmits the detected network setting information to the network connection device.

According to another aspect, there is provided a network system including: a network connection device that requests for network setting information by transmitting unique device information of the network connection device to a predetermined server apparatus and performs network setting based on the network setting information received in response to the request; and the predetermined server apparatus that stores network setting information corresponding to the network connection device included in an individual household in a database that is internally installed, detects the network setting information corresponding to the unique device information in the database in response to the request, and transmits the detected network setting information to the network connection device.

BRIEF DESCRIPTION OF THE DRAWINGS

The above and other features and advantages of the present invention will become more apparent by describing in detail exemplary embodiments thereof with reference to the attached drawings in which:

FIG. 4 is a block diagram illustrating a network system according to another embodiment; and FIG. 5 is a diagram illustrating a method of setting a network, according to another embodiment.

DETAILED DESCRIPTION

Figure 1:
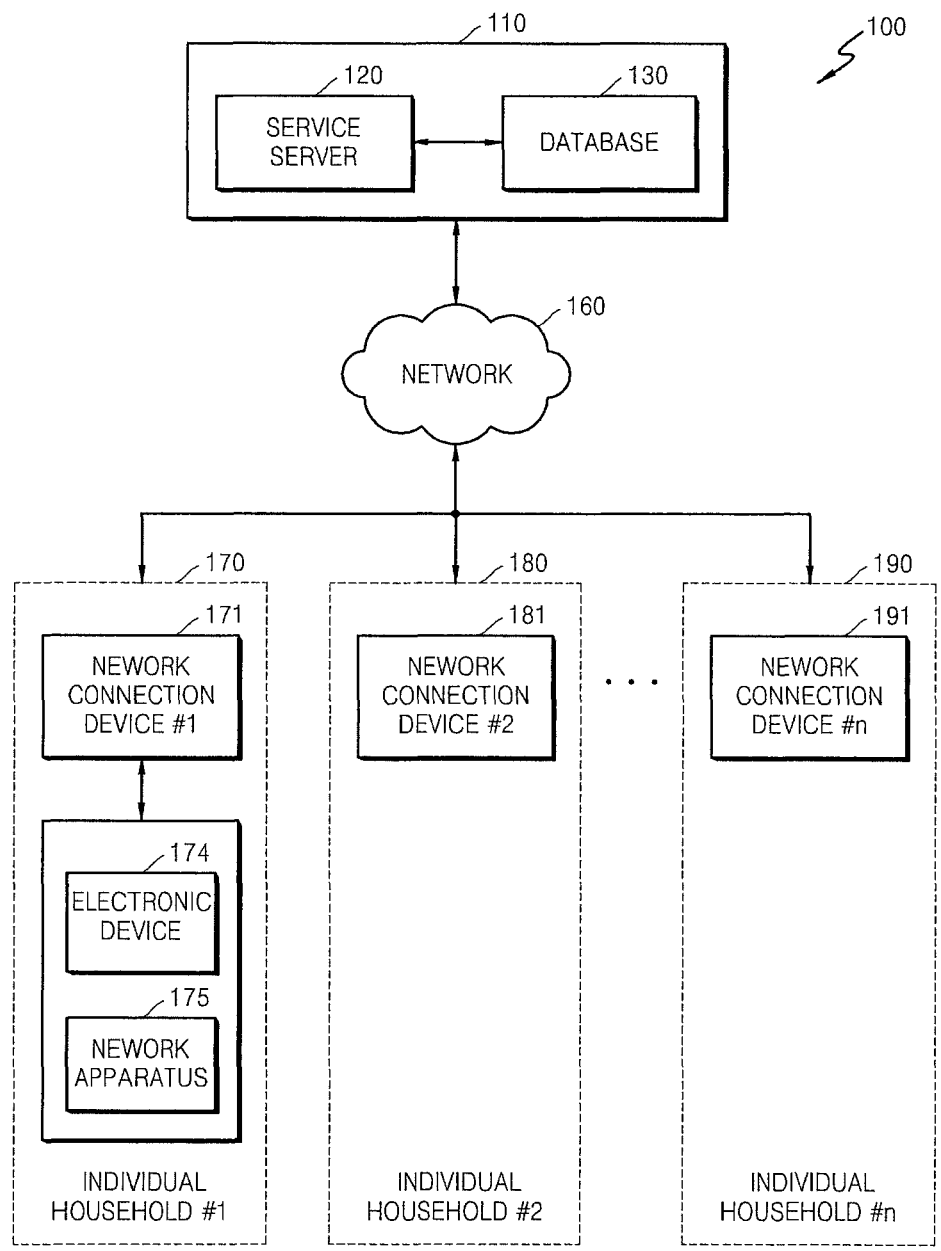
FIG. 1 is a block diagram illustrating a network system according to an embodiment.

Reference will now be made in detail to the embodiments, examples of which are illustrated in the accompanying drawings, wherein like reference numerals refer to the like elements throughout. The embodiments are described below to explain the present invention by referring to the figures.

A method of setting a network, a server apparatus using the method, and a network system including the server apparatus may be used for network setting for forming a network between a predetermined server and each of a plurality of individual households in a housing complex including the plurality of individual households. The predetermined server may be a server that provides and collects smart grid information for realizing a smart grid system, a server for realizing a home networking system, or a server for providing other predetermined services.

A network system to be described with reference to FIG. 1 includes a server apparatus, and one or more network connection devices included in a plurality of individual households connected through a network to the server apparatus.

FIG. 1 is a block diagram illustrating a network system 100 according to an embodiment.

Referring to FIG. 1, the network system 100 includes a server apparatus 110 and one or more network connection devices 171, 181, and 191. The network connection devices 171, 181, and 191, which are devices used by individual households 170, 180, and 190 to connect to a network 160, may be respectively disposed in the individual households 170, 180, and 190.

The individual households 170, 180, and 190 may be independent living spaces included in a housing complex such as an apartment complex, a villa complex, or an apartment-type factory complex. In FIG. 1, one network connection device 171 is disposed in one individual household 170.

Also, a network connection device, for example, the network connection device 171, may be included in an individual household, and an electronic device 174 connected wired or wirelessly to the network connection device 171 may be connected to a predetermined network. For example, the network connection device 171 may be a gateway (G/W) device, and specifically may be a demand response (DR) G/W device.

The electronic device included in each individual household, for example, device 174 included in household 170, may transmit and receive predetermined data to and from a predetermined server apparatus, for example, the server apparatus 110, through a network, for example, the network 160. The electronic device 174 may be a home appliance such as a computer, a laptop computer, a smart television, a washing machine, or a fridge, and may include a network device 175 internally or externally.

Also, the network device 175, which is a network communication module for enabling the electronic device 174 to be connected to a network, may include a local area network (LAN) card or a router. The network device 175 may vary according to a type of a network service which the electronic device 174 uses. Examples of the network service used by the electronic device 174 may include a LAN service, a wide area network (WAN) service, a wireless LAN (WiFi) service, a wireless broadband (Wibro) service, a code division multiple access (CDMA) service, or a wideband code division multiple access (WCDMA) service.

The following explanation will be made on the assumption that a network connection device is the network connection device 171.

The network connection device 171 may request network setting information by transmitting unique device information of the network connection device 171 to the server apparatus 110. The network connection device 171 may control network setting needed to form a network in an individual household to be performed based on the network setting information received in response to the request. In detail, the network connection device 171 may control network setting to be performed in at least one of the network connection device 171 and the network device 175 based on the network setting information.

The unique device information of the network connection device 171 is unique identification information of the network connection device 171 for individually identifying the network connection device 171 among the plurality of network connection devices 171, 181, and 191. In detail, the unique device information may include a media access control (MAC) address of the network connection device 171. Since different network connection devices have different MAC addresses, the network connection device 171 may be identified by detecting a MAC address.

Also, network setting information includes one or more network setting values needed to set a network according to types of network services.

In order for the electronic device 174 to connect to a predetermined network, the network device 175 that may use a predetermined network service is necessary. Also, the network device 175 should perform network setting corresponding to the predetermined network service. For example, if the electronic device 174 uses a WiFi service as a predetermined network service, the network device 175 may be a WiFi communication module. In this case, the network device 175 should set an extended service set identity (ESSID), a transmission power (Tx power) value, and an access point (AP) channel, which are network setting values in accordance with a WiFi network. Network setting corresponding to a predetermined network service used by an individual household may be performed by using network setting information transmitted by the server apparatus 110.

The server apparatus 110 may include a service server 120 and a database 130. The server apparatus 110 may be a server for performing network setting in a plurality of individual households.

The service server 120 may transmit network setting information corresponding to unique device information of the network connection device 171 to the network connection device 171. In detail, the service server 120 may transmit setting values needed to set a network in order for at least one of the network connection device 171 and the network device 175 for forming a network in the individual household 170 to completely set the network.

In detail, the service server 120 may receive unique device information of the network connection device 171 from the network connection device 171, and may detect network setting information corresponding to the unique device information in the database 130. The service server 120 may transmit the detected network setting information to the network connection device 171.

The database 130 may store the network setting information corresponding to the network connection device 171. The network setting information may vary according to a type of a network service, or specifications of the network connection device 171. The network setting information will be explained in detail with reference to FIG. 3.

Figure 2:
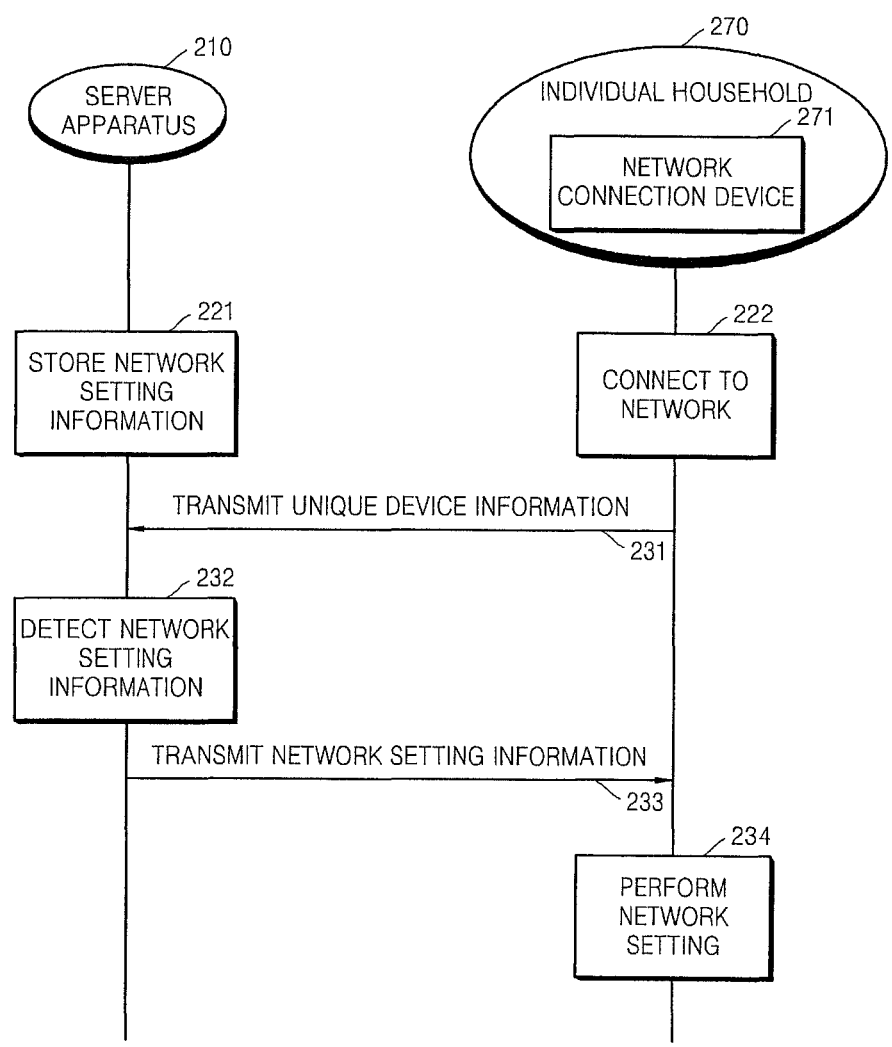
FIG. 2 is a diagram illustrating a method of setting a network, according to an embodiment.

FIG. 2 is a diagram illustrating a method of setting a network, according to an embodiment. The method of FIG. 2 may be performed in the server apparatus 110, the network connection device 171, and the network system 100 of FIG. 1. Accordingly, the method will be explained with reference to FIGS. 1 and 2.

A server apparatus 210, an individual household 270, and a network connection device 271 in FIG. 2 respectively correspond to the server apparatus 110, the individual household 170, and the network connection device 171 in FIG. 1.

Referring to FIG. 2, in operation 221, network setting information corresponding to the network connection device 271 may be stored in the database 130. Network setting values may vary according to specifications of the network connection device 171 or a type of a network service which the network connection device 271 may provide.

Also, the network setting information stored in the database 130 may be designed and stored as an optimized value for the network connection device 271 by at least one of a manufacturer or user of the network connection device 271, a manufacturer or user of the network device 175, and a manufacturer or user of the server apparatus 210.

Figure 3:
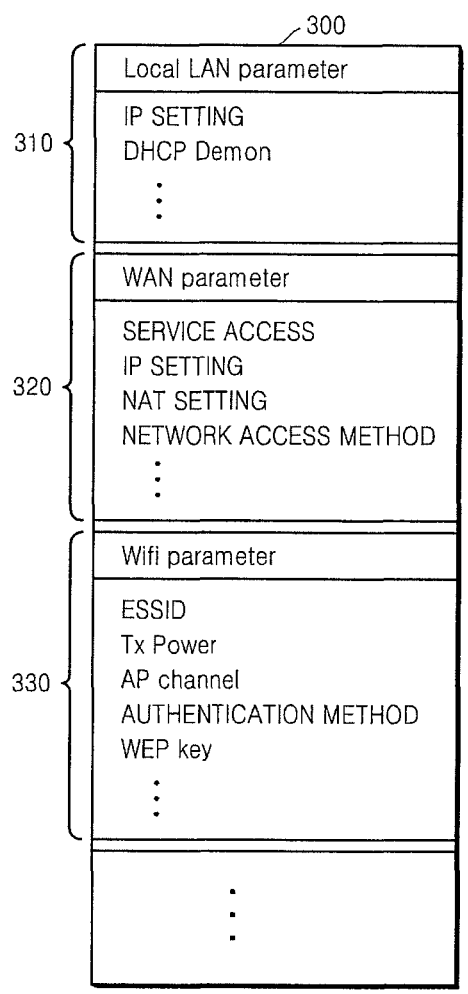
FIG. 3 is a block diagram illustrating network setting information stored in a server apparatus, according to an embodiment.

FIG. 3 is a block diagram illustrating network setting information stored in the server apparatus 110, according to an embodiment.

Also, the database 130 may match unique device information to one or more network setting values applied to a network connection device corresponding to the unique device information and store the unique device information and the network setting values. For example, if unique device information corresponding to the network connection device 171 is MAC1, the database 130 may match the MAC1 to network setting information, for example, 300, applied to the network connection device 171 and store the MAC1 and the network setting information 300.

In FIG. 3, the network setting information 300 may include, for example, network setting values (local LAN parameters) 310 applied to a local LAN, network setting values (WAN parameters) 320 applied to a WAN, and network setting values (WiFi parameters) 330 applied to a WiFi.

In detail, the network setting values (local LAN parameters) 310 applied to the local LAN may include an Internet protocol (IP) setting value for LAN connection and a dynamic host configuration protocol (DHCP) Demon value, the network setting values (WAN parameter) 320 applied to the WAN may include service access information, an IP setting value for WAN connection, a NAT setting value, and a network access method information, and the network setting values (WiFi parameter) 330 applied to the WiFi may include an extended service set identifier (ESSID), a Tx Power value, an access point (AP) channel, authentication method information, and a wired equivalent privacy (WEP) key.

In operation 221, network setting information including network setting values corresponding to each network connection device may be stored in the database 130 of the server apparatus 210.

The network setting information stored in the database 130 may be periodically or non-periodically updated by at least one of a manufacturer or user of the network connection device 271, a manufacturer or user of the network device 175, and a manufacturer or user of the server apparatus 210. Due to the updating, the database 130 may flexibly respond to a change in the network connection device 271 or the release of a new network service.

In operation 222, the network connection device 271 may be connected to the network 160. Operation 222 for transmitting and receiving predetermined data between the network connection device 271 and the server apparatus 210 through the network 160 may be performed before operation 231.

In operation 231, unique device information may be transmitted from the network connection device 271. In detail, the network connection device 271 may transmit its own MAC address.

In operation 232, the service server 120 of the server apparatus 210 may detect network setting information corresponding to the unique device information in the database 130. The database 130 may store network setting information corresponding to each network connection device. Since a network connection device may be determined by detecting unique device information, corresponding network setting information may be detected by using unique device information.

In operation 233, the service server 120 of the server apparatus 210 may transmit the network setting information detected in operation 232 to the network connection device 271.

Data transmission/reception between the server apparatus 210 and the service server 120 may be performed through the network 160 connected in operation 222.

In operation 234, the network connection device 271 may control network setting needed to form a network in the individual household 270 to be performed by using the network setting information received in operation 233. For example, if the network device 175 used by the electronic device 174 is a WiFi module, network setting may be completed in at least one of the network device 175 and the network connection device 271 connected to the network device 175 by using the WiFi setting values 330. Operation 234 may be automatically performed when the network setting information is received in operation 233.

Network setting may be automatically completed by using the method of FIG. 2 in each of the individual households 180 and 190 other than the individual household 170 of FIG. 1.

FIG. 4 is a block diagram illustrating a network system 400 according to another embodiment.

A server apparatus 410 may further include at least one of a DHCP server 440 and an authentication server 450 compared to the server apparatus 110 of FIG. 1. The server apparatus 410, a service server 420, a database 430, a network 460, individual households 470, 480, and 490, a network connection device 471, and a network device 475 illustrated in FIG. 4 correspond to the server apparatus 110, the service server 120, the database 130, the network 160, the individual households 170, 180, and 190, the network connection device 171, and the network device 175 illustrated in FIG. 1, and thus a repeated explanation thereof will not be given.

The DHCP server 440 may allocate information, for example, an IP address, needed for the network connection device 471 to connect to the service server 420. The following explanation will be made on the assumption that server position information needed to connect to a predetermined server is an IP address. An IP address needed to connect to the service server 420 may be an IP address for directly accessing the service server 420, or if the server apparatus 410 further includes the authentication server 450, may be an IP address for accessing the authentication server 450.

In detail, the network connection device 471 may request the DHCP server 440 for an IP address needed to connect to the service server 420, and the DHCP server 440 may transmit an IP address having a predetermined value to the network connection device 471 according to a DHCP Demon in response to the request.

The authentication server 450 may be connected through the IP address allocated and transmitted by the DHCP server 440, and may determine whether the network connection device 471 has the right to access the service server 420 or the database 430 connected through the service server 420. When the network connection device 471 is authenticated, the authentication server 450 may allocate and transmit the IP address for connecting to the service server 420 to the network connection device 471.

In detail, the authentication may be performed by determining whether the network connection device 471 has the right to access at least one of the service server 420 and the database 430. For example, identifier Internet personal identification number (PIN) information or the like allocated during the manufacture of the network connection device 471 may be transmitted to the authentication server 450, and the authentication server 450 may perform authentication by confirming the identifier PIN information. When the network connection device 471 is successfully authenticated, the network connection device 471 accesses the service server 420 by using the IP address transmitted by the authentication server 450.

In FIG. 4, the network device 475 included in the individual household 470 may include a LAN module, a WAN module, and a WiFi module. Also, the network connection device 471 may connect to a LAN, a WAN, and a WiFi.

FIG. 5 is a diagram illustrating a method of setting a network, according to another embodiment. The method of FIG. 5 may be performed in the server apparatuses 110 and 410, the network connection devices 171 and 471, and the network systems 100 and 400 of FIGS. 1 and 4. Accordingly, the method will be explained with reference to FIGS. 4 and 5. Also, a server apparatus 510, an individual household 570, and a network connection device 571 of FIG. 5 correspond to the server apparatus 410, the individual household 470, and the network connection device 471 of FIG. 4. Also, operations 521, 522, 531, 532, 533, and 534 of FIG. 5 correspond to operations 221, 222, 231, 232, 233, and 234, and thus a detailed explanation thereof will not be given.

In operation 522, the network connection device 571 may be connected to the network 460. In detail, networks to which the network connection device 571 may be connected are searched for and the network connection device 571 may be connected to at least one network from among the searched networks.

In operation 523, the network connection device 571 may connect to the DHCP server 440 through the network connected in operation 522 and may request for an IP address needed to connect to the service server 420.

In operation 524, in response to the request in operation 523, the DHCP server 440 may allocate and transmit an IP address to the network connection device 571.

The network connection device 571 may access the service server 420 by using the IP address allocated in operation 524. Accordingly, the network connection device 571 may connect to the service sever 420 and perform operation 531. If the server apparatus 510 further includes the authentication server 450, the IP address transmitted in operation 524 may be an IP address for accessing the authentication server 450.

If the server apparatus 510 further includes the authentication server 450, operation 525 may be further performed.

In detail, in operation 526, the network connection device 571 may request the authentication server 450 for authentication.

In operation 527, in response to the request in operation 526, authentication may be performed in the authentication server 450.

In operation 528, when the authentication in operation 527 is completed, the authentication server 450 may allocate and transmit the IP address for connecting to the service server 420 to the network connection device 571.

Operations 531, 532, 533, and 534 may be performed continuously.

Also, the methods of FIGS. 2 and 5 correspond to operations of the server apparatuses 110 and 410, the network connection devices 171 and 471, and the network systems 100 and 400 according to the embodiments. Accordingly, a repeated explanation between the method of FIG. 5 and the server apparatuses 110 and 410, the network connection devices 171 and 471, and the network systems 100 and 400 of FIGS. 1 and 4 will not be given.

A method of setting a network, a server apparatus using the method, and a network system including the server apparatus according to the embodiments of FIGS. 1 through 5 may automatically perform network setting in an individual household by using network setting information transmitted by the server apparatus. Accordingly, a network setting time may be minimized, and the network setting in each individual household may be quickly and conveniently completed in a large-scale housing complex or the like.

Also, since the network setting is automatically performed in an individual household by using the network setting information by the server apparatus, errors which may occur when network setting is manually performed may be avoided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of setting a network, the method comprising:
storing, in a database of a predetermined server apparatus, network setting information relating to a type of network service and corresponding to a gateway for connecting to a predetermined network, the gateway being included in an individual household;

transmitting unique device information of the gateway to the predetermined server apparatus;

detecting the network setting information corresponding to the unique device information from the database and transmitting the detected network setting information to the gateway;

performing network setting needed to form a network in the individual household by using the network setting information;

requesting a predetermined authentication server for authentication, wherein the requesting is performed by the gateway;

in response to the request, performing authentication for allowing access to the predetermined server apparatus, wherein the authentication is performed by the authentication server; and when the authentication is completed, allocating an IP address for accessing the predetermined sever apparatus and transmitting the IP address to the gateway.

2. The method of claim 1, wherein the unique device information is identification information individually identifying the gateway.

3. The method of claim 2, wherein the unique device information is a media access control (MAC) address of the gateway.

4. The method of claim 1, wherein the network setting information comprises one or more network setting values corresponding to a predetermined network service.

5. The method of claim 4, wherein the network setting information comprises at least one selected from the group consisting of network service access information for accessing the predetermined network service, Internet protocol (IP) setting information, network access method information for connecting to a predetermined network, authentication information of the predetermined network service, and identification information of the predetermined network.

6. The method of claim 1, further comprising:
connecting the gateway to a predetermined network;
connecting to a dynamic host configuration protocol (DHCP) server through the predetermined network to be allocated an IP address; and
accessing the predetermined server apparatus by using the IP address.

7. The method of claim 1, wherein the network setting information is updated by a manufacturer of the gateway or a user of the gateway.

8. A server apparatus for performing network setting needed to form a network in an individual household, the server apparatus comprising:
a database that stores network setting information relating to a type of network service and corresponding to a gateway for connecting to a predetermined network;
a service server that receives unique device information of the gateway, detects network setting information corresponding to the unique device information in the database, and transmits the detected network setting information to the gateway; and
an authentication server that performs authentication by determining whether the gateway has the right to access the service server, and when the authentication is completed, allocates an IP address for connecting to the service server to the gateway.

9. The server apparatus of claim 8, wherein the unique device information is identification information individually identifying the gateway.

10. The server apparatus of claim 9, wherein the unique device information is a MAC address of the gateway.

11. The server apparatus of claim 8, wherein the database matches the unique device information to one or more network setting values in the gateway corresponding to the unique device information and stores the unique device information and the one or more network setting values.

12. The server apparatus of claim 8, further comprising a DHCP server that allocates an IP address needed for the gateway to connect to the service server.

13. The server apparatus of claim 8, wherein the network setting information is updated by one of a manufacturer of the gateway, a user of the gateway, a manufacturer of the server apparatus, or a user of the server apparatus.

14. The server apparatus of claim 8, wherein the network setting information comprises at least one selected from the group consisting of network service access information for accessing the predetermined network service, IP setting information, network access method information for connecting to a predetermined network, authentication information of the predetermined network service, and identification information of the predetermined network.

15. A network system comprising:
gateway for connecting to a predetermined network, wherein the gateway requests for network setting information relating to a type of network service and by transmitting unique device information of the gateway to a predetermined server apparatus and performs network setting based on the network setting information received in response to the request;

the predetermined server apparatus that stores network setting information relating to a type of network service and corresponding to the gateway, the gateway being included in an individual household, in a database that is internally installed, detects the network setting information corresponding to the unique device information in the database in response to the request, and transmits the detected network setting information to the gateway; and an authentication server that performs authentication by determining whether the gateway has the right to access the predetermined server, and when the authentication is completed, allocates an IP address for connecting to the predetermined server to the gateway.

16. The network system of claim 15, wherein the unique device information is a MAC address of the gateway.

17. The network system of claim 15, wherein the network setting information comprises one or more network setting values corresponding to a predetermined network service.

18. The network system of claim 15, wherein the network setting information is updated by one of a manufacturer of the gateway, a user of the gateway, a manufacturer of the server apparatus, or a user of the server apparatus.

* * * * *